March 26, 1963     M. L. COURTER     3,083,213
ETHYLENE OXIDE PRODUCTION
Filed Feb. 23, 1960
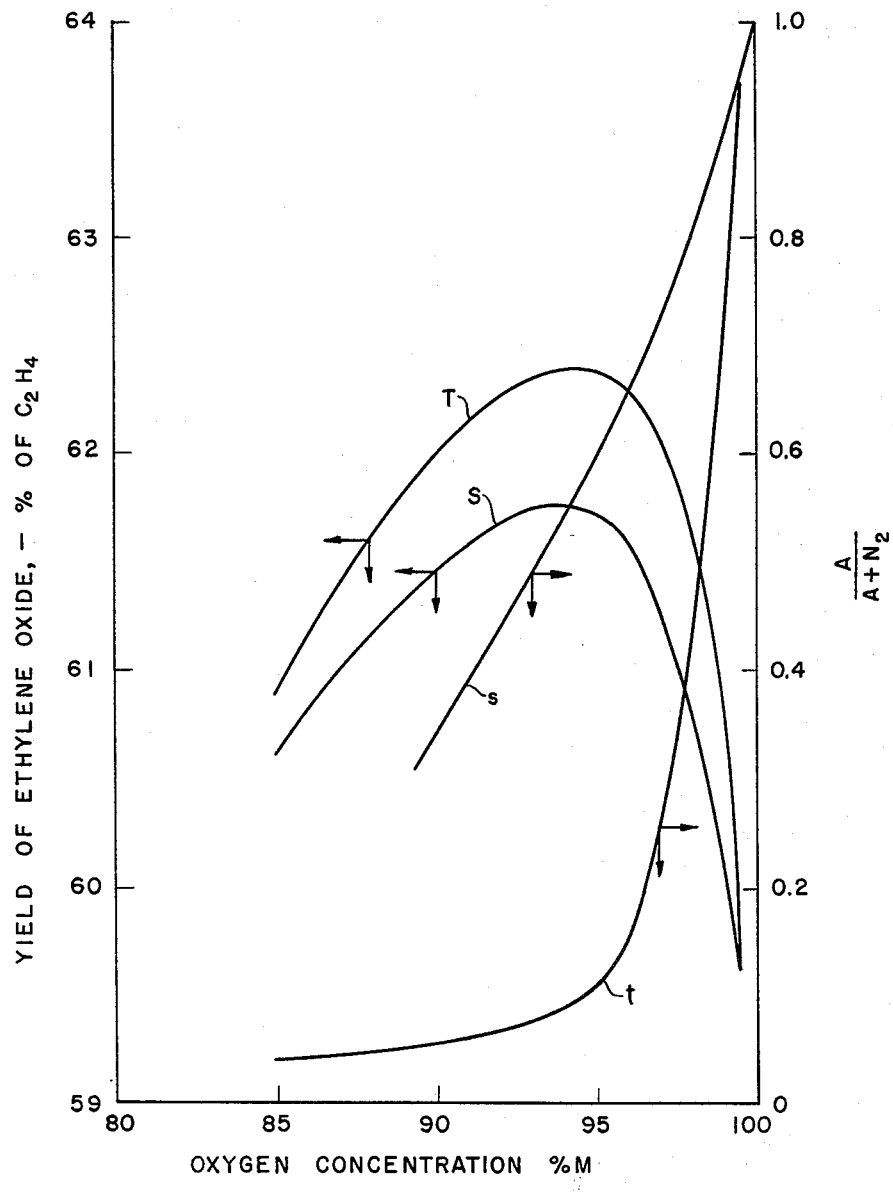
INVENTOR:
MARTIN L. COURTER
BY
HIS AGENT

United States Patent Office

3,083,213
Patented Mar. 26, 1963

3,083,213
ETHYLENE OXIDE PRODUCTION
Martin L. Courter, Walnut Creek, Calif., assignor to Shell Oil Company, New York, N.Y., a corporation of Delaware
Filed Feb. 23, 1960, Ser. No. 10,394
5 Claims. (Cl. 260—348.5)

This invention relates to the production of ethylene oxide by the silver-catalyzed oxidation of ethylene with molecular oxygen.

In the silver-catalyzed oxidation of ethylene to ethylene oxide advantage resides in the use of concentrated oxygen rather than air as the source of the oxygen reactant. The use of oxygen in concentrated form, rather than air, reduces the volume of gaseous materials passing through reaction and recovery zones, thereby decreasing considerably the size and initial cost of equipment required. The handling of smaller volumes of gas in the system simplifies control as well as cost of operation. It is found, however, that advantages potentially inherent in the use of concentrated oxygen are not always fully realized. At times the adverse effect is reflected in substantial loss in yield. More generally, the loss in yield appears to the unskilled to be relatively small. However, in large scale operation consistent and unavoidable reduction in yield of the order of only a single, or even a fraction, of a percent represents a serious economic impediment to successful operation of the process.

Inability to attain optimum yield, it has been found, is often attributable to some extent to sensitivity of the process to variations in composition of the materials charged thereto. It has now been found that, quite surprisingly, a contributing factor is the presence in the oxygen charge to the process of material which, though heretofore considered to be inert, does nevertheless, under certain circumstances, function as a deterrent to the attainment of optimum results. Furthermore, such contaminant material, it has now been found, comprises argon.

It is, therefore, an object of the present invention to provide an improved process for the production of ethylene oxide by the silver-catalyzed oxidation of ethylene with molecular oxygen wherein the above difficulties are obviated to at least a substantial degree. More particular objects and advantages of the present invention will become apparent from the following detailed description thereof made with reference to the attached drawing wherein the graph shows:

Curve $s$, obtained by plotting the values for the ratio $$\frac{A}{A+N_2}$$

(right ordinates) against undiluted oxygen concentration for mixtures consisting essentially of oxygen, argon and nitrogen obtained from a conventional concentrated oxygen producing plant wherein concentrated oxygen is separated from air;

Curve S, obtained by plotting the yield of ethylene oxide (left ordinates) obtained in silver-catalyzed ethylene oxidation against the oxygen concentration, and therefore against values of $$\frac{A}{A+N_2}$$

of the molecular oxygen charge when using as molecular oxygen charge the undiluted oxygen-containing mixtures shown in curve $s$;

Curve $t$, obtained by plotting the values for the ratio $$\frac{A}{A+N_2}$$

(right ordinates) against oxygen concentration for mixtures consisting essentially of oxygen, argon and nitrogen obtained by diluting with air oxygen of 99.5% purity emanating from a conventional concentrated oxygen producing plant wherein concentrated oxygen is separated from air; and Curve T, obtained by plotting yield of ethylene oxide (left ordinates) obtained in silver-catalyzed ethylene oxidation against concentration, and therefor against values of $$\frac{A}{A+N_2}$$

of the molecular oxygen charge when using as molecular oxygen charge the air-diluted oxygen-containing mixtures shown in curve $t$.

In the expression $$\text{``}\frac{A}{A+N_2}\text{''}$$

as used herein and in the attached claims "A" signifies mols of argon and "$N_2$" mols of nitrogen in the oxygen-containing mixtures referred to in connection therewith.

In accordance with the present invention the controlled silver-catalyzed oxidation of ethylene to ethylene oxide with concentrated molecular oxygen is carried out with considerably improved efficiency by removing from the concentrated molecular oxygen at least substantial part of the argon normally present therein.

It has additionally been found that substantial improvement in the efficiency of the oxidation of ethylene to ethylene oxide with molecular oxygen is obtained when using as the oxygen charge to the system a concentrated oxygen gas, obtained by separation from air, consisting essentially of a mixture of oxygen, nitrogen and argon containing at least 85% oxygen wherein the argon and nitrogen concentration are such that the value for the ratio $$\frac{A}{A+N_2}$$

wherein A represents the number of mols of argon and $N_2$ the number of mols of nitrogen in the mixture, has a maximum value of about 0.6.

In a preferred embodiment of the invention the concentrated oxygen charge having the required composition characteristics is obtained by separating from air a highly concentrated oxygen having a value for the ratio $$\frac{A}{A+N_2}$$

in excess of about 0.6 and diluting said concentrated oxygen by the controlled addition of air to result in a less concentrated oxygen having a value for the ratio $$\frac{A}{A+N_2}$$

below about 0.6.

In the production of ethylene oxide by the silver-catalyzed controlled oxidation of ethylene with molecular oxygen in accordance with the invention, the reactants comprising ethylene and concentrated oxygen are passed over a catalyst containing metallic silver at conditions of temperature and pressure resulting in the interaction of ethylene and oxygen with the formation of reaction products comprising ethylene oxide.

Catalysts employed in the process of the invention comprise any of the silver metal-containing catalysts disclosed in the prior art capable of catalyzing the controlled oxidation with molecular oxygen of ethylene to ethylene oxide. These comprise the catalysts consisting essentially of silver metal upon a suitable support. Suitable supports comprise, for example, any of the siliceous and aluminous support materials. Particularly suitable catalysts comprise those consisting essentially of silver metal upon such supports as alundum, silicon carbide, silica, Carborundum, any of the many alumina supports, etc. Suitable catalysts comprise, for example, those disclosed and claimed in the U.S. Patents 2,424,983; 2,424,085; and 2,446,132. It is to be understood, however, that the present invention is in no way limited to the use of any specific silver metal-containing catalyst.

The controlled oxidation reaction is carried out at temperatures in the range of, for example, from about 150 to 450° C., and preferably in the range from about 200 to about 300° C. Pressures in the range of from about atmospheric to about 500 p.s.i. are generally employed. Higher pressures may, however, be used within the scope of the invention. Diluent materials such as, for example, nitrogen, carbon dioxide, steam, saturated hydrocarbons, etc., may be present in varying amounts. Such diluents may be introduced into the systems willfully from an outside source; and they may be recycled from within the system alone or together with unreacted materials.

Agents capable of exerting a favorable effect upon the catalytic oxidation reaction are optionally employed. Any of the agents disclosed in the prior art as suitable for the modification and/or control of the silver-catalyst in the ethylene oxidation reaction may be employed. Such agents comprise, for example, halogen-containing compounds such as chlorinated hydrocarbons including ethylene dichloride, the chlorinated polyphenyl compounds, etc. These agents are generally employed in the amount disclosed as suitable in the prior art literature. They are generally effective in relatively small amounts. Thus, the chlorinated polyphenyl compounds are generally added in an amount which is less than about 10 parts per million of the gas mixture. Mixtures of the various addition agents heretofore employed may be used within the scope of the invention.

A preferred concentrated oxygen gas, suitable for use as the oxygen reactant in the process of the invention, comprises the concentrated oxygen gas consisting essentially of oxygen, nitrogen and argon obtained from any suitable source, for example, from air by suitable separating means comprising one or more such steps as fractionation, low temperature distillation and other conventional separating means. The suitable oxygen containing gas must have an oxygen concentration of at least about 85% M. Since the amount of gaseous materials which must be vented from the oxidation process varies directly with increase in inert gaseous diluents present, and any increase in materials vented is generally accompanied by a decrease in yield of ethylene oxide from ethylene feed, it it preferred to employ molecular oxygen gas having the higher values for oxygen concentration, for example, from about 89 to about 98 mol percent. Particularly preferred is the use of a concentrated oxygen containing from about 90 to about 97% M. of molecular oxygen. Essential to the attainment of the objects of the invention is the presence of the nitrogen and argon components in such relative concentrations that the value for the ratio $$\frac{A}{A+N_2}$$

wherein A represents the number of mols of argon and $N_2$ the number of mols of nitrogen in the mixture, is below about 0.6.

Concentrated oxygen as used commercially is generally obtained by separation from air. The ability to integrate efficiently a unit producing oxygen from air as, for example, by fractionation, with a chemical operation relying upon molecular oxygen as an essential reactant marks a distinct advance in the chemical industry. Concentrated oxygen, particularly when obtained from air, will generally contain argon. The amount of argon in the oxygen may vary considerably. As a consequence of the relatively fixed composition of air the concentrations of argon and nitrogen in the concentrated oxygen-gas separated from air by practical scale means will generally also have a limiting and fixed relationship. Since it is exceedingly difficult to effect complete separation between all of the nitrogen and argon components the relative concentration of the argon is effectively expressed by the fraction $$\frac{A}{A+N_2}$$

wherein A and $N_2$ have the above defined meaning. As the purity of the concentrated oxygen is increased the argon concentration as expressed by the value of the ratio $$\frac{A}{A+N_2}$$

increases. This is evidenced by the following example:

*Example I*

In a series of operations mixtures consisting essentially of oxygen, nitrogen and argon are obtained by fractionation of air in a conventional concentrated oxygen producing unit. Conditions are varied to obtain mixtures of progressively increasing oxygen concentration. The composition of the mixtures obtained is determined and the oxygen concentration (abscissae) in mol percent is plotted against the value for the ratio $$\frac{A}{A+N_2}$$

for the corresponding mixture (right ordinates) to obtain the curve "s" shown in the graph of the attached drawing.

It is seen from curve s that as the oxygen concentration in the oxygen-nitrogen-argon mixtures so obtained enters the region of the higher and more desirable oxygen concentrations the relative concentration of argon, as reflected by the value of the ratio $$\frac{A}{A+N_2}$$

is appreciable and increases progressively with increase in oxygen purity. Attempts to minimize the adverse effect of relatively high argon concentration in the oxidation process by the use of a less pure oxygen obtained in this manner is offset by a substantial increase in vent loss sustained in the oxidation system and consequently a loss in valuable ethylene oxide yield. A further deterrent to the use of a less pure oxygen obtained in this manner resides in the fact that the oxygen producing units employed on commercial scale generally necessitate the production of oxygen of at least 95% concentration to attain optimum efficiency of the oxygen producing unit. At these high oxygen concentrations, however, the relative argon content of the oxygen-nitrogen-argon mixtures is generally exceedingly high. It is apparent, therefore, that prior art procedure involving the use of a unit producing gas of high oxygen concentration in combination with a chemical reaction process employing the concentrated oxygen-gas so produced as a reactant charge does not lend itself to the use of a concentrated oxygen-gas having both a desirably high oxygen concentration and relatively low argon content. The use of a concentrated oxygen-gas of this type must, therefore, be freed of at least a substantial part of its argon content before it can be used with optimum efficiency in a reaction system wherein the presence of argon is found to be undesirable. This, however, is often difficult and exceedingly costly when carried out in the manner used heretofore.

In accordance with the present invention mixtures consisting essentially of oxygen, argon and nitrogen having a high oxygen concentration and a relatively low argon content, as reflected by the value of the ratio $$\frac{A}{A+N_2}$$

are obtained by first separating a mixture consisting essentially of oxygen, nitrogen and argon having an oxygen concentration in excess of 95% and preferably of at least 98% M by separation from air, and diluting the resulting oxygen-containing mixture with a controlled amount of air to obtain a more dilute oxygen-containing mixture having a substantially reduced relative argon content as reflected by the value of the ratio $$\frac{A}{A+N_2}$$

for the mixture. The initial separation of the oxygen-nitrogen-argon mixture from air may be carried out by conventional means involving the separation of a concentrated oxygen from air, for example, by one or more such steps as fractionation, distillation adsorption and the like.

*Example II*

A mixture consisting essentially of oxygen, nitrogen, and argon having an oxygen concentration of 99.5% M is separated from air by fractionation in a conventional high purity oxygen producing unit. The value of the ratio $$\frac{A}{A+N_2}$$

for the 99.5% M oxygen mixture so obtained is about 9.4. Separate portions of the mixture so obtained are diluted with air in varying quantities and the oxygen concentration and value of the ratio $$\frac{A}{A+N_2}$$

determined for each air-diluted mixture so obtained. Plotting the values for $$\frac{A}{A+N_2}$$

(right ordinates) against concentrations (abscissae) results in the curve $t$ of the graph of the attached drawing. By comparing curve $s$ with curve $t$ it is seen that the argon concentration, as reflected in the ratio $$\frac{A}{A+N_2}$$

are far lower in the air-diluted mixtures (curve $t$) than in those obtained by direct separation from air (curve $s$) having equivalent oxygen concentration. Thus, whereas the argon content, in terms of the value for the ratio $$\frac{A}{A+N_2}$$

for a 95% M oxygen mixture is 0.6 when the mixture is obtained by direct separation from air (curve $s$), the air-diluted mixture though also having a 95% M oxygen concentration has an argon content of only 0.1 in terms of the ratio $$\frac{A}{A+N_2}$$

It is seen that provision is therefore made for the obtaining on a practical scale of high purity oxygen having substantially reduced argon content from air as compared with practical scale concentrated oxygen producing methods practiced heretofore. The invention is applied with advantage in effecting any chemical operations wherein high purity oxygen is employed as a reactant. It is applied with particular advantage in the execution of chemical reactions involving molecular oxygen wherein the presence of argon in substantial amount is found to be disadvantageous, as in the oxidation of ethylene to ethylene oxide. Consistently higher yields are obtained by effecting a reduction of the argon content of the oxygen-containing mixture used in the oxidation as evidenced by the following example.

*Example III*

In a plurality of operations ethylene is oxidized to ethylene oxide in the presence of a silver metal catalyst by reaction with concentrated oxygen-containing gas consisting essentially of oxygen, nitrogen and argon and having an oxygen concentration of at least 85% M obtained by direct separation (fractionation) from air in a conventional oxygen producing unit. The oxidation reaction is executed at a temperature of 260–265° C. The ethylene content of the feed is maintained in excess of about 10%. All runs are carried out under substantially identical conditions with the exception that the percentage composition of the oxygen-nitrogen-argon mixtures obtained directly from the oxygen producing unit are varied by control of the oxygen separation unit. The ethylene oxide yield is determined for each run. Curve S in the graph of the attached drawing is obtained by plotting the ethylene oxide yield (left ordinate) against oxygen concentration (abscissae) of the oxygen-gas charged. The relative argon content in terms of $$\frac{A}{A+N_2}$$

for the oxygen mixtures charged to the reaction as represented by curve S are plotted (as right ordinates) against the oxygen concentration of the mixtures (abscissae) to give curve $s$ (e.g., curves S and $s$ have common abscissae). The operation is repeated under substantially identical conditions but with the exception that oxygen mixtures having lower relative argon contents were used. The oxygen-nitrogen-argon mixtures of lower argon content were obtained by separating an oxygen-nitrogen-argon mixture having an oxygen concentration of 99.5% M from air (by fractionation) and diluting this mixture with controlled amounts of air before passage to the reaction zone. The ethylene oxide yield obtained is plotted against concentration of oxygen in the air-diluted oxygen-gas charged to the reaction to give the curve T of the graph of the attached drawing. The relative argon content, in terms of the ratio $$\frac{A}{A+N_2}$$

for the air-diluted oxygen-gas charged to the oxidation reaction as represented by curve T is plotted (as right ordinates) against the oxygen concentration of the air-diluted mixtures charged (abscissae) to give curve $t$ (e.g., curves T and $t$ have common abscissae). It is seen from the graph that the ethylen oxide yield is consistently significantly higher when the argon content $$\left(\frac{A}{A+N_2}\right)$$

of the oxygen-gas charged is reduced, other conditions being substantially the same. Thus with a mixture of oxygen-nitrogen-argon containing 95% M oxygen obtained by direct separation from air and having a relative argon content of 0.6 in terms of $$\frac{A}{A+N_2}$$

the ethylene oxide yield is 61.75%. When using an oxygen-nitrogen-argon mixture also containing 95% oxygen but obtained by diluting with air the 99.5% M oxygen obtained by air fractionation the argon content is only 0.1 in terms of $$\frac{A}{A+N_2}$$

and the ethylene oxide yield is now increased to 62.4%.

It is seen that optimum yield of ethylene oxide is obtained using an oxygen-nitrogen-argon mixture having an oxygen concentration of from about 90 to 97%, preferably about 95%. It is also apparent from the graph so obtained that a still further increment in ethylene oxide, when using this optimum concentration of oxygen, is made possible in accordance with the invention by adjusting the composition of the oxygen-nitrogen-argon mixture used so that the value for the ratio $$\frac{A}{A+N_2}$$

will be in the range of from about 0.05 to about 0.6, preferably about 0.1.

The invention thus provides a highly efficient practical scale method for obtaining high purity oxygen having a lower relative argon content for a given oxygen concentration than obtainable heretofore in practical scale operations. The extent to which it is necessary to reduce the relative argon content of the oxygen-nitrogen-argon mixture obtained by separation is governed by the use to which the mixtures are to be put. In the case of silver-catalyzed oxidation of ethylene to ethylene oxide it is desirable to reduce the argon concentration to a minimum. It has been found that the value of 0.6 for the ratio $$\frac{A}{A+N_2}$$

for the oxygen-nitrogen-argon mixture marks a critical point in the high purity oxygen-containing mixtures suitable for the silver catalyzed ethylene oxidation to ethylene oxide as evidenced by the graph of the attached drawing.

In its broad aspect the invention comprises the use as the oxygen reactant in the silver-catalyzed ethylene oxidation an oxygen-nitrogen-argon mixture having an oxygen concentration in the range of from about 85 to about 98% and preferably from 90 to 97%, wherein the argon concentration in terms of the ratio $$\frac{A}{A+N_2}$$

for the mixture is below about 0.6. Though in a preferred embodiment of the invention the ethylene oxidation is effected in combination with a high purity oxygen producing system wherein the relative argon content of the oxygen-nitrogen-argon mixture emanating from the oxygen producing system is diluted with air before it is passed into the ethylene oxidation zone the invention is not necessarily limited thereto. The reduction of argon content of the high purity oxygen to be used as reactant in the ethylene oxidation to a value below about 0.6 in terms of the ratio $$\frac{A}{A+N_2}$$

by other means is comprised within the scope of the invention. Thus at least a part or all of the argon content of the oxygen-nitrogen-argon mixture employed as the oxygen-containing charge to the ethylene oxidation may be separated therefrom by any suitable means disclosed in the prior art enabling such separation.

I claim as my invention:

1. In the process for the production of ethylene oxide wherein normally gaseous hydrocarbons comprising ethylene are contacted at ethylene oxide forming conditions, in the temperature range of from about 150 to about 450° C., in the presence of a silver metal-containing catalyst, with an oxygen-containing gas separated from air consisting essentially of from about 95 to about 99.5% oxygen and an amount of argon and nitrogen such that the value of the ratio $$\frac{A}{A+N_2}$$

wherein A represents the number of mols of argon and $N_2$ the number of mols of nitrogen in said oxygen-containing gas, is in the range of from about 0.6 to about 1, the improvement which comprises adding air to said oxygen-containing gas in such controlled amount that the oxygen concentration in the resulting gaseous mixture is in the range of from about 85 to about 98% and the value of said ratio $$\frac{A}{A+N_2}$$

is reduced to a lower value in the range of from about 0.05 to about 0.6 before contacting said normally gaseous hydrocarbons therewith.

2. In the process for the production of ethylene oxide wherein ethylene is reacted in the presence of a silver-containing catalyst at ethylene oxide forming conditions at a temperature of from about 150 to about 450° C. with an oxygen-containing gas consisting essentially of a mixture of oxygen, nitrogen and argon, which mixture has an oxygen content in the range of from about 95 to about 99.5% and the concentration of argon and nitrogen therein is such that the value of the ratio $$\frac{A}{A+N_2}$$

wherein A represents the number of mols of argon and $N_2$ the number of mols of nitrogen in said mixture, has a value in the range of from about 0.6 to about 1, the improvement which comprises diluting said oxygen-containing gas with a controlled amount of air to obtain an oxygen-containing gas wherein the oxygen concentration in the resulting gaseous mixture is in the range of from about 90 to about 97% and the concentrations of argon and of nitrogen are such that the value for said ratio $$\frac{A}{A+N_2}$$

for the resulting air diluted mixture is reduced to a lower value which is in the range of from about 0.05 to about 0.6 before reacting said ethylene therewith.

3. In the integrated process for the production of ethylene oxide comprising a concentrated oxygen producing zone and an ethylene oxidation zone, wherein concentrated oxygen consisting essentially of oxygen, nitrogen and argon having an oxygen concentration in the range of from about 95 to about 99.5% is separated from air in said concentrated oxygen producing zone, the concentration of argon and nitrogen in said concentrated oxygen being such that the value of the ratio $$\frac{A}{A+N_2}$$

is in the range of from about 0.6 to about 1, A representing the number of mols of argon and $N_2$ the number of mols of nitrogen in said concentrated oxygen, ethylene is reacted with oxygen in the presence of a silver metal catalyst at ethylene oxide forming conditions in said oxidation zone, and said concentrated oxygen is passed from said oxygen producing zone into said oxidation zone, the improvement which comprises adding air to said concentrated oxygen emanating from said concentrated oxygen producing zone before introducing said concentrated oxygen into said oxidation zone, and controlling said air addition so that the oxygen concentration in the resulting gaseous mixture is in the range of from about 90 to about 97% and the value for said ratio $$\frac{A}{A+N_2}$$

for the concentrated oxygen after said air addition is reduced to a lower value in the range of from about 0.05 to about 0.6.

4. In the integrated process for the production of ethylene oxide comprising a concentrated oxygen-gas producing zone and an ethylene oxidation zone, wherein a concentrated oxygen-gas is separated from air in said concentrated oxygen-gas producing zone, ethylene is reacted with oxygen in the presence of a silver catalyst at ethylene oxide-forming conditions in said oxidation zone, and concentrated oxygen-gas is passed from said concentrated oxygen-gas producing zone to said oxidation zone, the improvement which comprises separating a concentrated oxygen-gas consisting essentially of oxygen, nitrogen and argon from air in said concentrated oxygen-gas producing zone, said concentrated oxygen-gas having an oxygen concentration of from about 90 to about 99.5% M and a concentration of argon and nitrogen such that the value of the ratio $$\frac{A}{A+N_2}$$

is in the range of from about 0.3 to about 1, A representing the number of mols of argon and $N_2$ the number of mols of nitrogen in said concentrated oxygen-gas, and diluting said concentrated oxygen-gas with a sufficient amount of air to obtain an oxygen concentration of from about 85 to about 98% in the resulting gaseous mixture and to reduce the value of said ratio $$\frac{A}{A+N_2}$$

to a lower value in the range of from about 0.05 to about 0.6 before introducing said concentrated oxygen-gas into said oxidation zone.

5. In the integrated process for the production of ethylene oxide comprising an oxygen-gas producing zone and an ethylene oxidizing zone, wherein an oxygen-gas consisting predominantly of oxygen and a minor amount of nitrogen and argon is separated from air by fractionation in said oxygen-gas producing zone, ethylene is reacted with oxygen in the presence of a silver catalyst at ethylene oxide-forming conditions in said ethylene oxidizing zone, and said oxygen-gas is passed from said oxygen-gas producing zone to said ethylene oxidizing zone, the improvement which comprises separating oxygen-gas having an oxygen content in the range of from about 95 to about 99.5% M and a concentration of nitrogen and argon such that the value of the ratio $$\frac{A}{A+N_2}$$

A representing the number of moles of argon and $N_2$ the number of moles of nitrogen in said oxygen gas, lies in the range of from about 0.6 to about 1 in said oxygen-gas producing zone, adding air to said oxygen-gas produced in said oxygen gas producing zone before introducing said oxygen-gas into said ethylene oxidizing zone, and controlling said air addition so that the resulting air-diluted oxygen gas has an oxygen concentration in the range of from about 85 to about 98% M and the concentration of argon and nitrogen therein is such that the value of said ratio $$\frac{A}{A+N_2}$$

is reduced to a lower value in the range from about 0.05 to about 0.6, in said air-diluted oxygen-gas.

References Cited in the file of this patent

UNITED STATES PATENTS

| | | |
|---|---|---|
| 2,125,333 | Carter | Aug. 2, 1938 |
| 2,653,952 | Egbert | Sept. 29, 1953 |
| 2,814,628 | Landau et al. | Nov. 26, 1957 |
| 2,831,870 | McClements et al. | Apr. 22, 1958 |
| 2,930,201 | Karwat | Mar. 29, 1960 |
| 2,934,908 | Latimer | May 3, 1960 |

FOREIGN PATENTS

| | | |
|---|---|---|
| 119,817 | Australia | Apr. 9, 1945 |